US012027748B2

(12) United States Patent
Han et al.

(10) Patent No.: US 12,027,748 B2
(45) Date of Patent: Jul. 2, 2024

(54) BRACKET FOR SUPPORTING WIRELESS COMMUNICATION DEVICE AND WIRELESS COMMUNICATION DEVICE SUPPORT ASSEMBLY USING SAME

(71) Applicant: KMW INC., Hwaseong-si (KR)

(72) Inventors: Yong Hee Han, Osan-si (KR); Jin Soo Yeo, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 209 days.

(21) Appl. No.: 17/390,808

(22) Filed: Jul. 30, 2021

(65) Prior Publication Data

US 2021/0359390 A1 Nov. 18, 2021

Related U.S. Application Data

(63) Continuation of application No. PCT/KR2020/000675, filed on Jan. 14, 2020.

(30) Foreign Application Priority Data

Feb. 1, 2019 (KR) ........................ 10-2019-0013400

(51) Int. Cl.
*H01Q 1/12* (2006.01)

(52) U.S. Cl.
CPC ..................................... *H01Q 1/12* (2013.01)

(58) Field of Classification Search
CPC ...... H01Q 1/12; H01Q 1/1207; H01Q 1/1228; H01Q 1/1242; H01Q 1/1246; H01Q 1/1264; H01Q 1/20; H01Q 3/01; H01Q 3/08; H01Q 3/12; H01Q 3/14
See application file for complete search history.

(56) References Cited

U.S. PATENT DOCUMENTS 5,533,304 A * 7/1996 Noble .................... H01Q 1/125
52/114
5,787,673 A * 8/1998 Noble ................... E04H 12/085
52/114
5,941,497 A * 8/1999 Inoue ..................... H01Q 1/125
248/514

(Continued)

FOREIGN PATENT DOCUMENTS

JP S47-031133 U 12/1972
JP H07-307606 A 11/1995

(Continued)

OTHER PUBLICATIONS

Non-final Office Action mailed Feb. 14, 2023 for Japanese Application No. 2021-544805 and its English translation.

(Continued)

*Primary Examiner* — Jason M Crawford
(74) *Attorney, Agent, or Firm* — Insight Law Group, PLLC; Seung Lee

(57) ABSTRACT

The present disclosure in at least one embodiment provides a wireless communication device support bracket, comprising a fixing unit configured to be fixed to the support pole, a main support unit extending from the fixing unit in a first direction, a sub-support unit extending from one end of the main support unit, and a connection unit rotatably connected to the sub-support unit about at least one rotation axis, the connection unit being configured to be connected with the wireless communication device.

15 Claims, 10 Drawing Sheets

(56) References Cited

U.S. PATENT DOCUMENTS

| | | | | |
|---|---|---|---|---|
| 6,232,928 | B1 * | 5/2001 | Zimmerman | H01Q 1/1242 343/890 |
| 6,264,152 | B1 * | 7/2001 | Bloch | F16M 11/126 343/882 |
| 6,283,425 | B1 * | 9/2001 | Liljevik | F16M 11/10 403/399 |
| 6,809,702 | B2 * | 10/2004 | Safakhah | H01Q 1/1242 343/890 |
| 7,113,145 | B1 * | 9/2006 | Noble | H01Q 1/1228 343/890 |
| 7,576,705 | B2 * | 8/2009 | Greenfield | H01Q 1/1228 343/890 |
| 9,882,260 | B2 * | 1/2018 | Mummert | H01Q 1/1242 |
| 10,218,046 | B2 * | 2/2019 | Hendrix | H04Q 1/08 |
| 11,417,941 | B2 * | 8/2022 | Jang | F16M 13/022 |
| 11,476,558 | B2 * | 10/2022 | Tsorng | H01Q 1/1228 |
| 11,608,933 | B2 * | 3/2023 | Tsorng | F16M 13/022 |
| 2007/0261355 | A1 * | 11/2007 | Carlisle | H01Q 1/1242 52/633 |
| 2008/0278402 | A1 * | 11/2008 | Kreitzberg | H01Q 1/1235 343/880 |
| 2011/0168855 | A1 * | 7/2011 | Bonczyk | H01Q 1/1242 248/201 |
| 2012/0234992 | A1 * | 9/2012 | Vanover | H01Q 1/1207 248/201 |
| 2014/0103184 | A1 | 4/2014 | Asrokin et al. | |
| 2015/0144758 | A1 * | 5/2015 | Kolokotronis | H01Q 1/1228 248/282.1 |
| 2015/0372379 | A1 * | 12/2015 | Zhao | H01Q 1/246 343/841 |
| 2016/0315392 | A1 * | 10/2016 | Tanabe | H01Q 3/20 |
| 2016/0352042 | A1 * | 12/2016 | Wankoff | H01R 13/6315 |
| 2016/0365618 | A1 * | 12/2016 | Kim | H01Q 1/1242 |
| 2017/0122490 | A1 | 5/2017 | Verstrate et al. | |
| 2017/0211745 | A1 * | 7/2017 | Alban | H01Q 1/1207 |
| 2017/0244158 | A1 * | 8/2017 | Ali | H01Q 1/1228 |
| 2017/0288294 | A1 * | 10/2017 | Kang | H01Q 1/34 |
| 2018/0026327 | A1 * | 1/2018 | Hendrix | H01Q 1/1228 455/562.1 |
| 2018/0115047 | A1 * | 4/2018 | Tsukada | H01Q 1/12 |
| 2021/0359390 | A1 * | 11/2021 | Han | H01Q 1/12 |
| 2021/0408661 | A1 * | 12/2021 | Yoo | H01Q 1/246 |
| 2021/0408662 | A1 * | 12/2021 | Yoo | H01Q 3/08 |
| 2022/0029270 | A1 * | 1/2022 | Yoo | F16B 2/065 |
| 2022/0037758 | A1 * | 2/2022 | Kim | H01Q 3/08 |
| 2022/0123455 | A1 * | 4/2022 | Kang | H01Q 3/08 |
| 2022/0140466 | A1 * | 5/2022 | Kim | H01Q 1/088 343/702 |
| 2022/0238982 | A1 * | 7/2022 | Kim | H01Q 1/1228 |
| 2023/0178874 | A1 * | 6/2023 | Kim | H01Q 1/1228 343/702 |

FOREIGN PATENT DOCUMENTS

| | | | |
|---|---|---|---|
| JP | 2002-290121 | A | 10/2002 |
| JP | 2011-049848 | A | 3/2011 |
| KR | 10-0888259 | B1 | 3/2009 |
| KR | 10-1455691 | B1 | 11/2014 |
| KR | 10-2015-0009214 | A | 1/2015 |
| KR | 10-1912637 | B1 | 10/2018 |
| KR | 10-1885040 | B1 | 8/2019 |

OTHER PUBLICATIONS

International Search Report for PCT/KR2020/000675 mailed Apr. 23, 2020 and its English translation.

Office Action mailed Nov. 23, 2020 from Korean Intellectual Property Office for Korean Application No. 10-2020-0004713.

Non-final Office Action mailed Sep. 6, 2022 for Japanese Application No. 2021-544805 and its English translation.

* cited by examiner

BRACKET FOR SUPPORTING WIRELESS COMMUNICATION DEVICE AND WIRELESS COMMUNICATION DEVICE SUPPORT ASSEMBLY USING SAME

CROSS-REFERENCE TO RELATED APPLICATIONS

This application is a continuation of International Application No. PCT/KR2020/000675, filed on Jan. 14, 2020, which priority from Korean Patent Application Number 10-2019-0013400, filed Feb. 1, 2019, the disclosure of which are incorporated by reference herein in their entirety.

TECHNICAL FIELD

The present disclosure relates to a wireless communication device support bracket and a wireless communication device support assembly using the support bracket.

BACKGROUND

The content described in this section merely provides background information for the present disclosure and does not constitute prior art.

In many cases, a wireless communication device used for transmitting and receiving wireless signals is installed on a building rooftop, a wall, or the like.

Generally, the wireless communication device may be arranged at an angle and position suitable for signal reception, for which purpose it is configured to be secured to a separate support pole. At this time, in order to effectively receive signals coming from various directions, a plurality of wireless communication devices may be used fixed to the support pole.

When a plurality of wireless communication devices are fixed on a support pole, since a space surrounding the support pole is limited, the number of wireless communication devices that can be installed can be extremely limited.

Accordingly, even if it is necessary to receive wireless signals from various types or directions, there may arise a problem that the object cannot be achieved due to the restriction of space for installing the wireless communication device.

SUMMARY

The present disclosure in at least one embodiment provides a wireless communication device support bracket, comprising a fixing unit configured to be fixed to the support pole, a main support unit extending from the fixing unit in a first direction, a sub-support unit extending from one end of the main support unit, and a connection unit rotatably connected to the sub-support unit about at least one rotation axis, the connection unit being configured to be connected with the wireless communication device.

The present disclosure in at least one embodiment provides the wireless communication device support bracket, comprising a fixing unit configured to be fixed to the support pole, a main support unit extending from the fixing unit in a first direction, a connection unit rotatably connected to one end of the main support unit about at least one rotation axis, the connection unit being configured to be connected to the wireless communication device.

The present disclosure in at least one embodiment provides a wireless communication device support assembly, comprising a central support unit comprising a support pole and a plurality of weight members disposed along a circumferential direction of the support pole, the weights providing support force to support pole, a fixing unit fixed to the support pole, a main support unit extending from the fixing unit in a first direction, a sub-support unit extending from one end of the main support unit, and a connection unit rotatably connected to the sub-support unit about at least one axis of rotation, the connection unit configured to connect with the wireless communication device.

The present disclosure in at least one embodiment provides the wireless communication device support assembly, comprising a central support unit comprising a support pole and a wall connection member formed on one side of the support pole, and configured to be fixed to an outer wall, a fixing unit fixed to the support pole, a main support unit extending from the fixing unit in a first direction, a sub-support unit extending from one end of the main support unit, and a connection unit rotatably connected to the sub-support unit about at least one axis of rotation, the connection unit configured to connect with the wireless communication device.

REFERENCE NUMERALS

Figure 1:
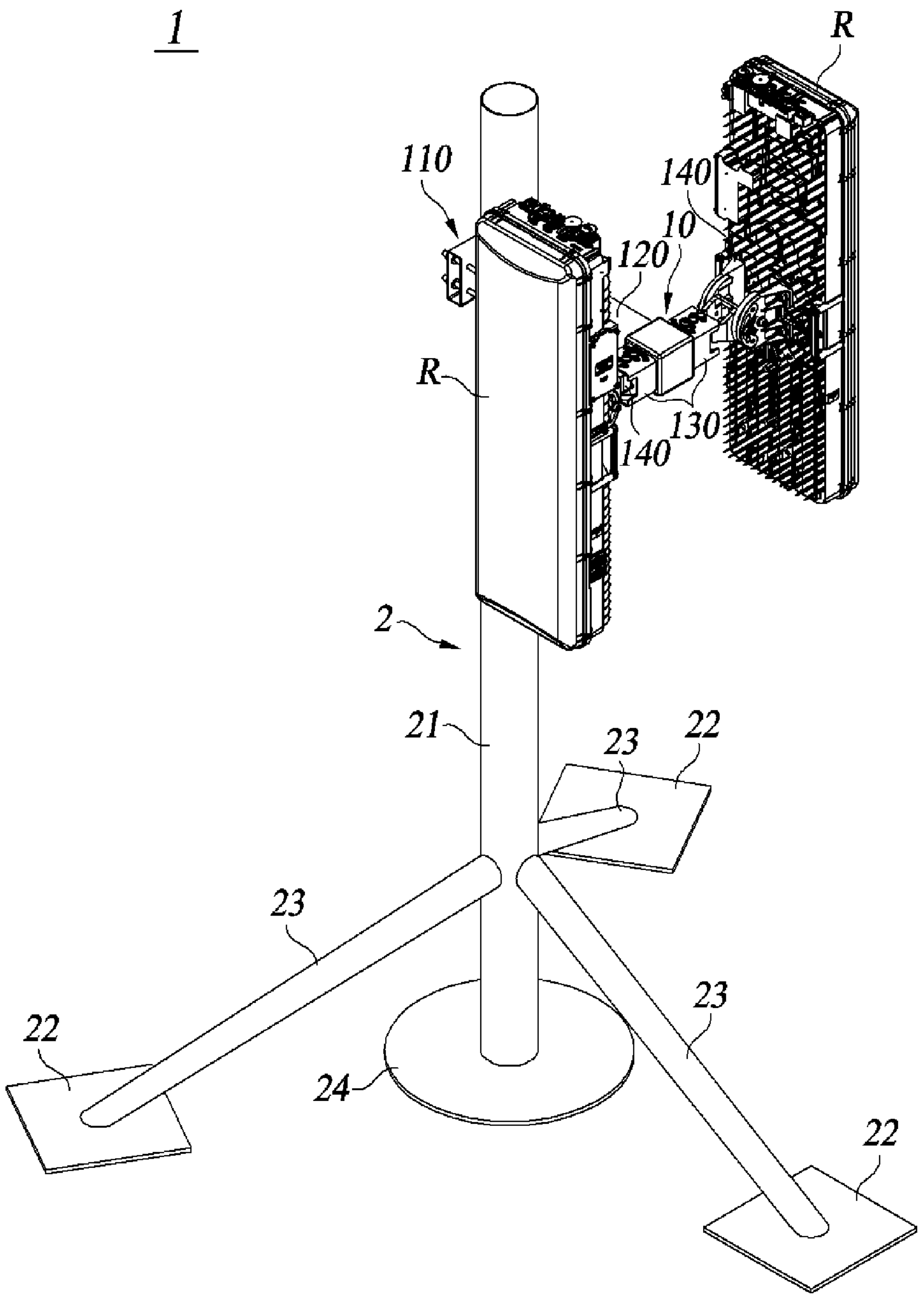
FIG. 1 illustrates a state in which a wireless communication device is mounted to a wireless communication device support assembly according to an embodiment of the present disclosure.

| | |
|---|---|
| 1: Support assembly | 10: Support bracket |
| 2: Central support unit | 21: Support pole |
| 22: Weight member | 72: Wall connection member |
| 110: Fixing unit | 112: First case |
| 114: Second case | 120: Main support unit |
| 130: Sub-support unit | 132: First support body |
| 140: Connection unit | 142: First connection body |
| 334: Second support unit | 344: Second connection body |
| 512: Hub | 514: Holding portion |

-continued

| | |
|---|---|
| 1422: First link member | 1424: First mounting member |
| 3442: Second link member | 3444: Second mounting member |

DETAILED DESCRIPTION

Accordingly, the present disclosure has an object to provide a wireless communication device support bracket and a wireless communication device support assembly capable of disposing the wireless communication device space-efficiently.

Some embodiments of the present disclosure will now be described in detail with reference to the illustrative drawings. It should be noted that, when reference numerals are added to the components in each drawing, the same components have the same numerals as possible, even if they are shown on different drawings. In the description of the present disclosure, a detailed description of a related known configuration or function is omitted when it is determined that the essentials of the disclosure can be misled.

In describing the components of the embodiments according to the present disclosure, reference numerals such as first, second, i), ii), a), and b) may be used. Such symbols are only for distinguishing the components from other components, and the nature or order of the components is not limited by the symbols. When a portion in the specification is referred to as "comprising" or "including" a component, it means that the component may further comprise other components rather than excluding other components unless explicitly stated to the contrary.

FIG. 1 illustrates a state in which a wireless communication device R is mounted to a wireless communication device support assembly 1 according to an embodiment of the present disclosure.

Referring to FIG. 1, a wireless communication device support assembly 1 may include a wireless communication device support bracket 10 and a central support unit 2.

The central support unit 2 can be installed on a building rooftop, a building wall, etc., and can provide a space that the support bracket 10 can be mounted.

Specifically, the central support unit 2 may include a support pole 21 to which the support bracket 10 may be fixed.

The central support unit 2 may comprise a member for securing the installation of the support pole 21. For example, the central support unit 2 may include a plurality of weight members 22, a plurality of connecting legs 23, and a floor support plate 24.

The plurality of weight members 22 may be disposed adjacent to one end of the support pole 21 on which the floor support plate 24 is formed, and may be arranged along the circumferential direction of the support pole 21.

One side of the plurality of weight members 22 may be configured to contact the ground and may be supported by the ground, such as the bottom support plate 24

The plurality of weight members 22 may be connected to the support pole 21 through the plurality of connecting legs 23 extending from the support pole 21.

The plurality of weight members 22 may provide a proper weight to the support pole 21, thereby providing a support force to the support pole 21. Thus, the support pole 21 can maintain its standing state even when impact or force is applied from the outside.

The floor support plate 24 may be formed at one end of the support pole 21. The floor support plate 24 may be a plate-shaped member that contacts the ground. The floor support plate 24 may be supported by the ground, thereby providing support to the support pole 21.

In FIG. 1, the central support unit 2 is shown supported by the ground, although the present disclosure is not limited thereto.

For example, the central support unit 2 may be installed on a wall of a building, not on the ground. In this case, the central support unit 2 may comprise a wall connection member (not shown). A detailed description of this is described with respect to FIGS. 6 to 9.

Referring again to FIG. 1, the support bracket 10 may be mounted to the support pole 21 of the central support unit 2.

Further, the wireless communication device R may be fixed to one side of the support bracket 10. The wireless communication device R may include an antenna therein, or may be connected to an external antenna, and may be configured to transmit and receive wireless signals.

The support bracket 10 may include a fixing unit 110 for fixing to the support pole 21 and a connection unit 140 for connecting to the wireless communication device R.

Further, the support bracket 10 may include a main support unit 120 and a sub-support unit 130 for supporting the connection unit 140 to the fixing unit 110.

The wireless communication device support bracket 10 according to an embodiment of the present disclosure is technically characterized in that the main support unit 120 is configured to extend long from the fixing unit 110 to further move the distance between the support pole 21 and the wireless communication device R.

As a result, it is possible to secure a sufficient space in which the wireless communication device R can be installed, thereby minimizing physical interference between the wireless communication device R even when a plurality of wireless communication device R are installed in the support pole 21.

Figure 2:
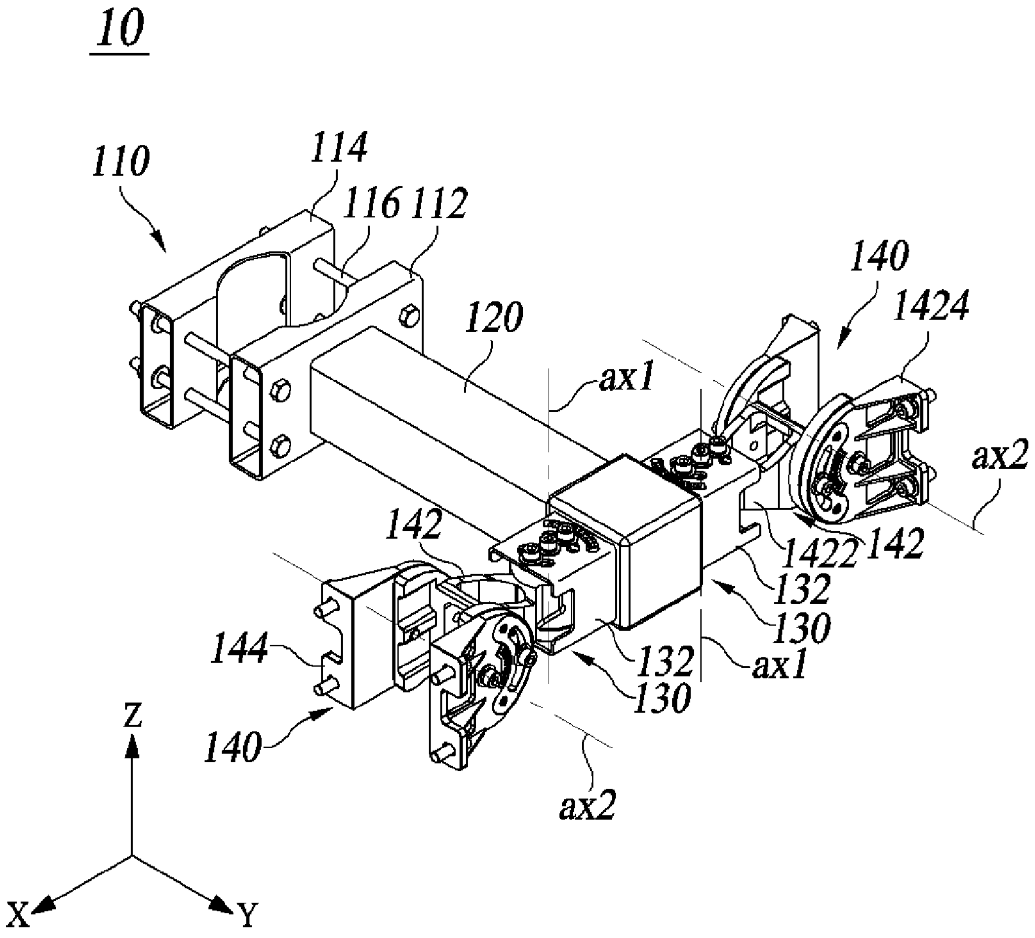
FIG. 2 is a perspective view of a wireless communication device support bracket according to an embodiment of the present disclosure.

FIG. 2 is a perspective view of a wireless communication device support bracket 10 according to an embodiment of the present disclosure.

Referring to FIG. 2, the support bracket 10 may include a fixing unit 110, a main support unit 120, a sub-support unit 130, and a connection unit 140.

The fixing unit 110 may be configured to be fixed to the support pole 21.

Specifically, the fixing unit 110 may include a first case 112, a second case 114, and a first pole connection screw 116.

The first case 112 may be connected to the other end of the main support 120, and the second case 114 may be disposed apart from the first case 112.

The first pole connection screw 116 can connect the first case 112 and the second case 114.

The distance between the first case 112 and the second case 114 can be adjusted by adjusting the degree of tightening of the first pole connection screw 116. The fixing unit 110 can be fixed to the support pole 21 or can be released from the fixing state thereof by adjusting the distance.

Meanwhile, the mutually opposing surfaces of the first case 112 and the second case 114 may have a curved shape corresponding to the support pole 21. As a result, the contact area of the first case 112 and the second case 114 with respect to the support pole 21 can be further widened, so that the fixing unit 110 can be more securely fixed to the support pole 21.

The first case 112 and the main support unit 120 may be made of separate members, but may be formed integrally as one.

In FIG. 2, the fixing unit 110 is shown to be fixed to the support pole 21 through screwing, but the present disclosure is not limited thereto. Accordingly, the fixing unit according to the present disclosure may be fixed to the support pole by other fixing methods.

Main support unit 120 may extend in a first direction from the fixing unit 110. When the fixing unit 110 is fixed to support pole 21, the first direction may be perpendicular to the extending direction of the support pole 21, but the present disclosure is not limited thereto.

Here, the first direction refers to an extending direction of the main support unit 120 relative to the fixing unit 110. Also, the extending direction of the support pole 21 refers to the direction in which the support pole 21 extends long, or may be a direction parallel to the Z axis with reference to FIG. 1.

The main support unit 120 extends in the first direction from the fixing unit 110, so that the distance between the support pole 21 and the wireless communication device R can be increased.

Therefore, even when the plurality of wireless communication devices R are installed in the support pole 21, physical interference between the plurality of the wireless communication devices R can be minimized. That is, space-efficient arrangement with respect to the plurality of wireless communication devices R is possible.

In FIG. 2, the support bracket 10 is shown to include one main support unit 120, but the present disclosure is not limited thereto.

For example, the support bracket 10 may include a plurality of the main support units 120. In this case, the first direction may be defined for each main support unit 120 of the plurality of the main support units 120.

The sub-support unit 130 may extend from one end of the main support unit 120.

The sub-support unit 130 may include a first support body 132 extending along a second direction different from the first direction. Here, the second direction refers to the extending direction of the first support body 132 with respect to one end of the main support unit 120.

The second direction may be perpendicular to the extension direction of the support pole 21 and the first direction, but the present disclosure is not limited thereto.

Two first support bodies 132 may extend from both sides of one end of the main support unit 120, respectively. In this case, the two first support bodies 132 and the main support unit 120 can form a ‘T’ shape as a whole.

The wireless communication device support bracket 10 according to an embodiment of the present disclosure includes a main support unit 120 and a sub-support unit 130 extending in a branched manner from the main support units 120, thereby implementing various shapes of support units. This allows a larger number of wireless communication devices R to be spatially efficiently disposed in one support bracket 10.

In FIG. 2, the main support unit 120 and the sub-support unit 130 are shown to form a ‘T’ shape, but the present disclosure is not limited thereto. Thus, the main support unit and the sub-support unit according to the present disclosure may have various other shapes.

The main support unit 120 and the first support body 132 may be made of separate members, but may be integrally formed as one.

The connection unit 140 may be rotatably connected to the sub-support unit 130 about at least one axis of rotation and may be connected to the wireless communication device R.

Specifically, the connection unit 140 may include a first connection body 142 connected with the first support body 132 of the sub-support unit 130.

The first connection body 142 may be rotatably connected to one end of the first support body 132 about at least one rotation axis and may be connected to the wireless communication device R.

The first connection body 142 may include a first link member 1422 and a first mounting member 1424.

One side of the first link member 1422 can be rotatably connected to one end of the first support body 132 about a first rotation axis ax1. The first rotation axis ax1 may be parallel to the extending direction of the support pole 21 with the fixing unit 110 fixed to the support pole 21.

The first mounting member 1424 can be rotatably connected to the other side of the first link member 1422 about a second rotation axis ax2 perpendicular to the first rotation axis ax1, and can be connected with the wireless communication device R.

The wireless communication device support bracket 10 according to an embodiment of the present disclosure is characterized in that the first connection body 142 is configured to be capable of biaxial rotation, so that the direction of the wireless communication device R connected to the first connection body 142 can be freely adjusted. For example, the installation direction of the wireless communication device R may be adjusted according to the transmission/reception direction.

The first mounting member 1424 may be connected to the wireless communication device R via a screw joint, but may also be connected with the wireless communication device R in other ways.

On the other hand, two first connection bodies 142 may be connected to two first support bodies 132, respectively. In this case, two wireless communication devices may be connected to each of the two first connection bodies 142.

Since the two first support bodies 132 and the main support unit 120 form a ‘T’ shape as a whole, the respective wireless communication devices connected to the first two connection bodies 142 may be spaced apart from each other. As such, physical interference between wireless communication devices can be minimized.

The second embodiment of the present disclosure shown in FIG. 3, which will be described later, is different from the embodiment shown in FIG. 1 and FIG. 2 in that the support bracket further includes a second support body and a second connection body. The different feature according to the second embodiment of the present disclosure will be described below with the priority, and repeated description of the same configuration as that of one embodiment of the present disclosure will be omitted.

Figure 3:
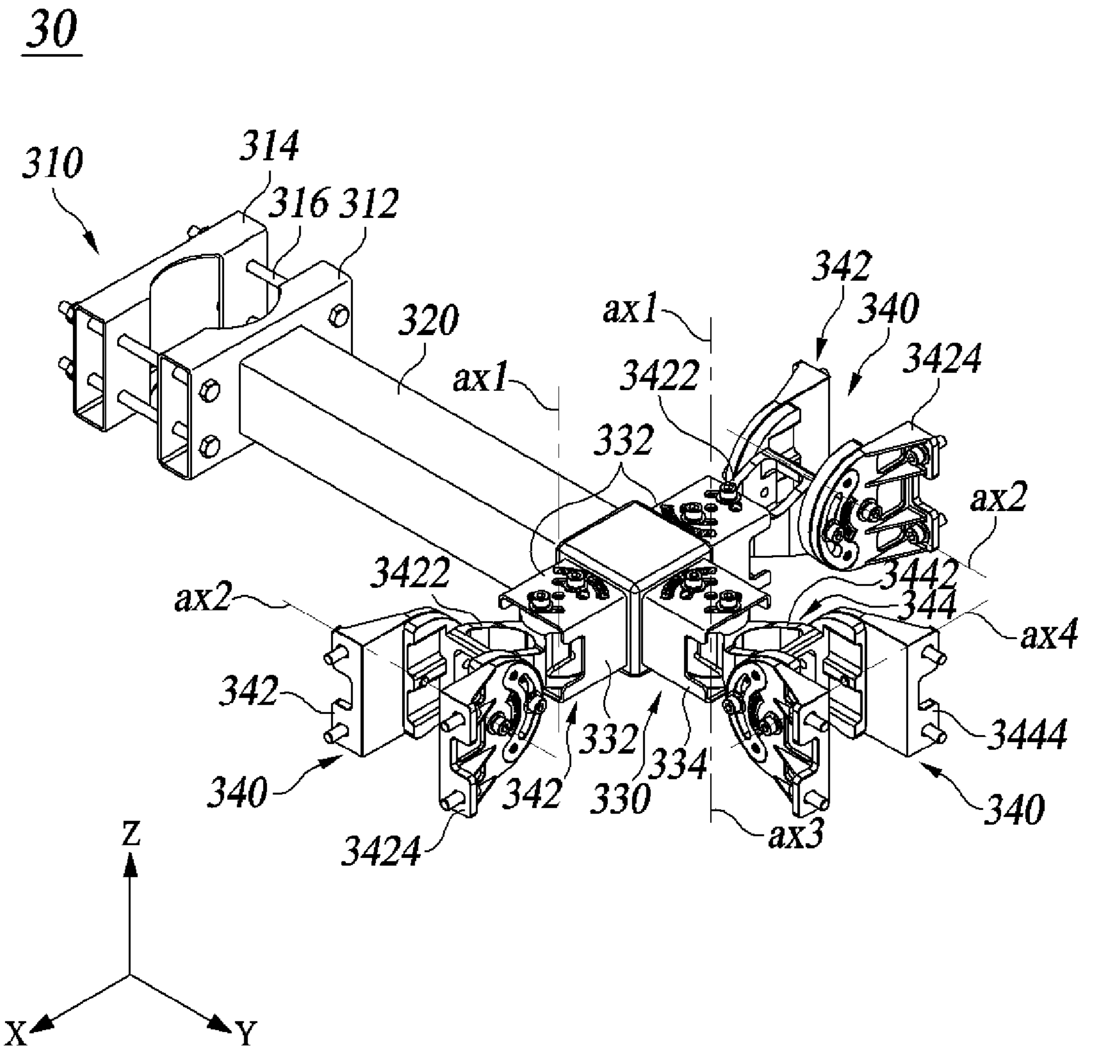
FIG. 3 is a perspective view of a wireless communication device support bracket according to a second embodiment of the present disclosure.

FIG. 3 is a perspective view of a wireless communication device support bracket 30 according to a second embodiment of the present disclosure.

Referring to FIG. 3, a sub-support unit 330 may include a first support body 332 and a second support body 334.

The first support body 332 may extend along a second direction different from a first direction. The second direction can be perpendicular to the extending direction of the support pole and the first direction.

The sub-support unit 330 may include two first support bodies 332, which may each extend from both sides of one end of the main support unit 320.

The second support body 334 may extend along the first direction from one end of the main support unit 320. Thus, the extending direction of the first support body 332 and the extending direction of the second support body 334 may be perpendicular to each other, and the two first support bodies 332, the second support bodies 334, and the main support unit 320 may be cross-shaped as a whole.

The main support unit 320 and the second support body 334 may be made of separate members, but may be integrally formed as one.

The connection unit 340 may include a first connection body 342 and a second connection body 344.

The first connection body 342 may include a first link member 3422 and a first mounting member 3424, and the second connection body 344 may include a second link member 3442 and a second mounting member 3444.

One side of the first link member 3422 may be rotatably connected to one end of a first support body 332 about a first rotation axis ax1. The first rotation axis ax1 may be parallel to the extending direction of the support pole in a state where the fixing unit 310 is fixed to the support pole.

The first mounting member 3424 may be rotatably connected to the other side of the first link member 3422 about a second rotation axis ax2 perpendicular to the first rotation axis ax1, and may be connected to a wireless communication device.

One side of the second link member 3442 may be rotatably connected to one end of a second support body 334 about a third rotation axis ax3. The third rotation axis ax3 may be parallel to the extending direction of the support pole in a state where the fixing unit 310 is fixed to the support pole. Thus, the first rotation axis ax1 and the third rotation axis ax3 can be parallel to each other.

The second mounting member 3444 can be rotatably connected to the other side of the second link member 3442 about a fourth rotation axis ax4 perpendicular to the third rotation axis ax3, and can be connected to the wireless communication device.

The second mounting member 3444 may be connected to the wireless communication device via a screw joint, but may also be connected in other ways.

The three wireless communication devices may be connected to two first connection bodies 342 and one second connection body 344, respectively.

Since the two first support bodies 332, the second support body 334, and the main support unit 320 are cross-shaped as a whole, the three wireless communication devices connected to the two first connection bodies 342 and one second connection body 344 may be spaced apart from each other. As such, physical interference between wireless communication devices can be minimized.

The third embodiment of the present disclosure shown in FIG. 4, which will be described later, is different from the embodiment shown in FIG. 1 and FIG. 2 in that the connection unit is connected directly to the main support unit. The different feature according to the third embodiment of the present disclosure will be described below with priority, and repeated description of the same configuration as that of one embodiment of the present disclosure will be omitted.

Figure 4:
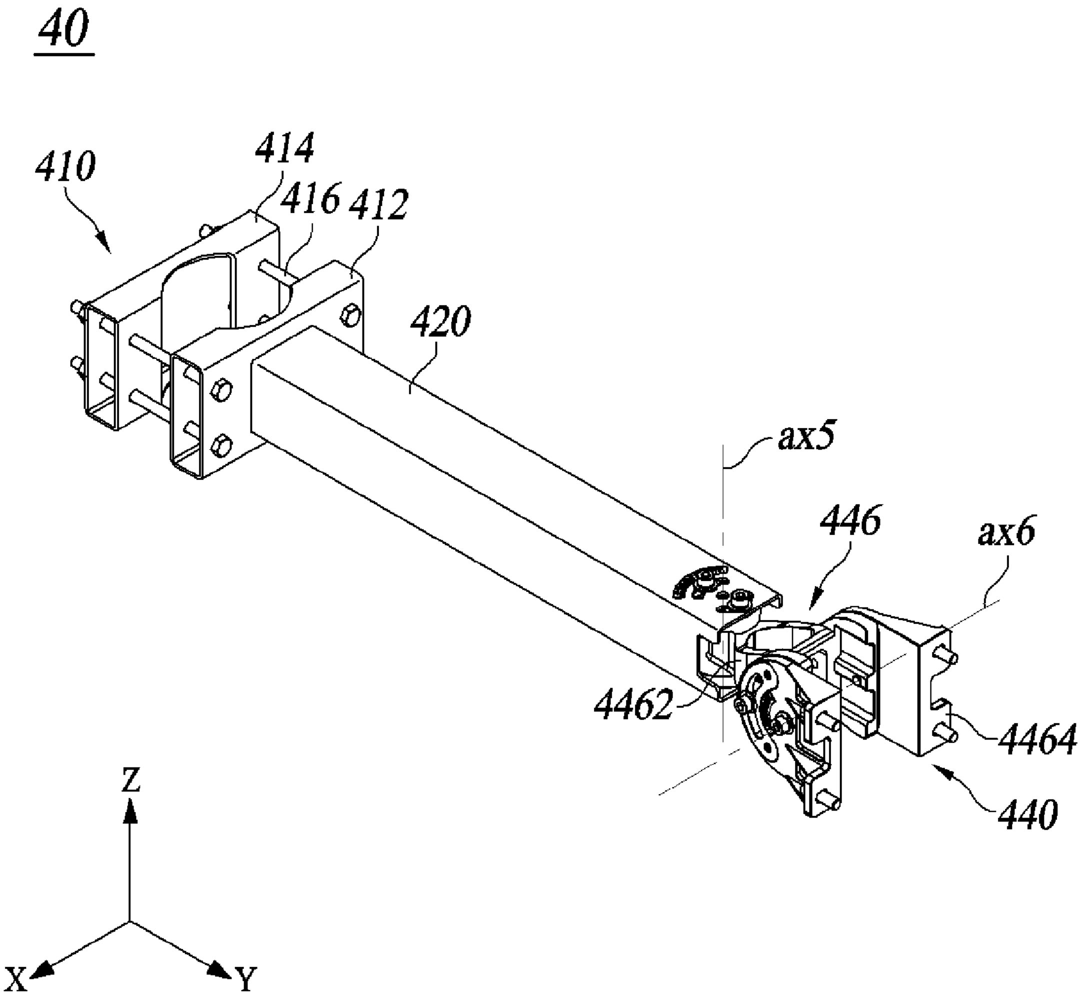
FIG. 4 is a perspective view of a wireless communication device support bracket according to a third embodiment of the present disclosure.

FIG. 4 is a perspective view of a wireless communication device support bracket 40 according to a third embodiment of the present disclosure.

Referring to FIG. 4, the support bracket 40 includes a main support unit 420 but does not include a sub-support unit. Thus, a connection unit 440 may be directly connected to the main support unit 420.

Specifically, the connection unit 440 may be rotatably connected to one end of the main support unit 420 about at least one rotation axis, and may be connected to a wireless communication device.

The connection unit 440 may include a third connection body 446, which may include a third link member 4462 and a third mounting member 4464.

One side of the third link member 4462 may be rotatably connected to one end of the main support unit 420 about a fifth rotation axis ax5. The fifth rotation axis ax5 may be parallel to the extending direction of the support pole in a state where the fixing unit 410 is fixed to the support pole.

The third mounting member 4464 may be rotatably connected to the other side of the third link member 4462 about a sixth rotation axis ax6 perpendicular to the fifth rotation axis ax5, and may be configured to be connected to the wireless communication device.

The third mounting member 4464 may be connected to the wireless communication device via a screw joint, but may also be connected in other ways.

The wireless communication device support bracket 40 according to the third embodiment of the present disclosure is configured such that the connection unit 440 is directly connected to the main support unit 420, thereby having an effect of being able to have a simpler structure and a clean exterior appearance.

The fourth embodiment of the present disclosure shown in FIG. 5, which will be described later, is different from the embodiment shown in FIG. 1 and FIG. 2 in that the wireless communication device support bracket includes a plurality of main support units. The different feature according to the fourth embodiment of the present disclosure will be described below with priority, and repeated description of a configuration the same as that of one embodiment of the present disclosure will be omitted.

Figure 5:
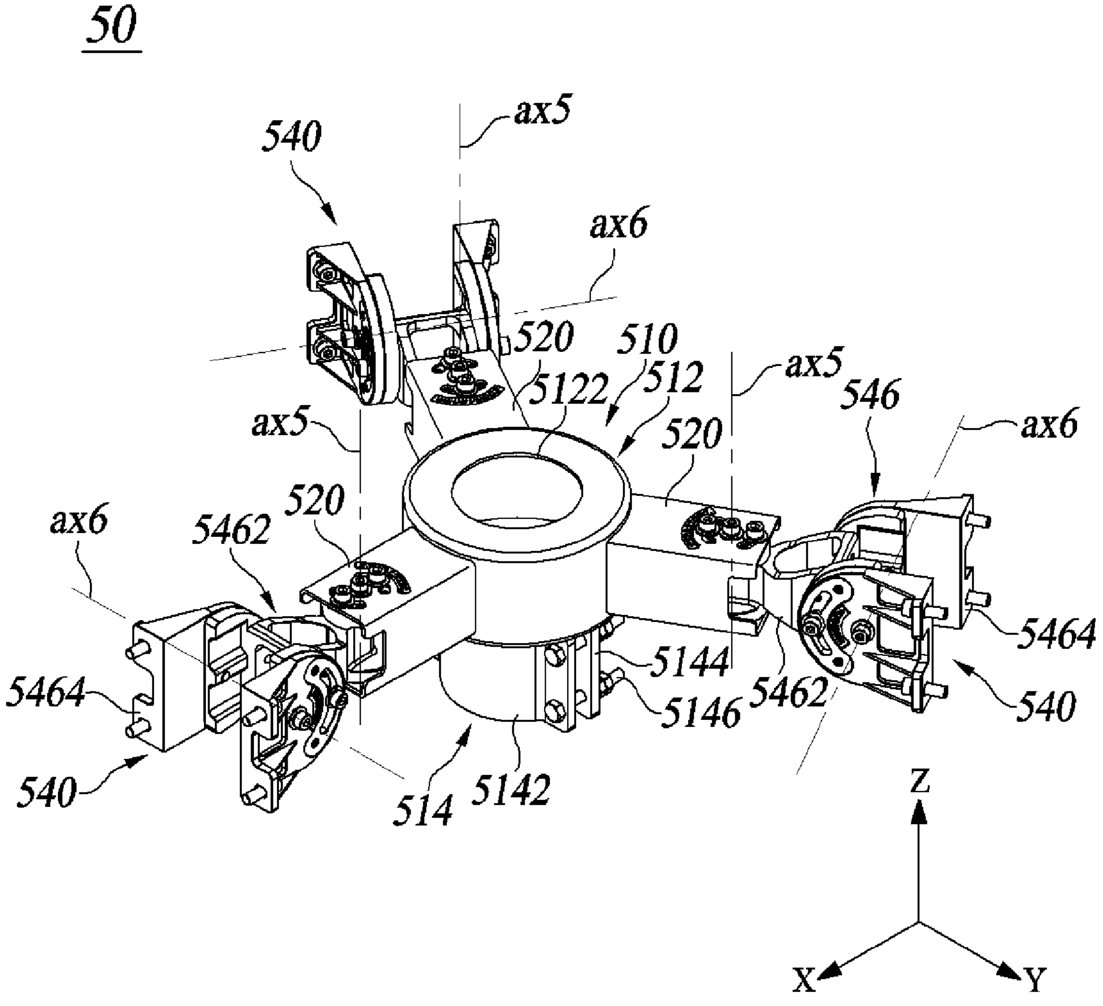
FIG. 5 is a perspective view of a wireless communication device support bracket according to a fourth embodiment of the present disclosure.

FIG. 5 is a perspective view of a wireless communication device support bracket 50 according to a fourth embodiment of the present disclosure.

Referring to FIG. 5, the support bracket 50 may include a plurality of main support units 520, and a fixing unit 510 may include a hub 512 and a holding portion 514.

The hub 512 may include a penetration hole 5122 that is configured for the support pole to penetrate. The plurality of main support units 520 may extend from an outer peripheral surface of the hub 512. In this case, the extending direction of the plurality of main support units 520 may be perpendicular to the extending direction of the support poles.

The holding portion 514 may be disposed on one side of the hub 512. For example, the holding portion 514 may be disposed at the bottom of the hub 512, although the present disclosure is not limited thereto.

The holding portion 514 may be configured to be fixed to a support pole penetrating through the penetration hole 5122.

Specifically, the holding portion 514 may include a third case 5142, a fourth case 5144, and a second pole connection screw 5146.

The third case 5142 and the fourth case 5144 may be disposed on one side of the hub 512. At this time, either the third case 5142 or the second case 5144 may be fixed to one side of the hub 512.

The third case 5142 and the fourth case 5144 may be disposed apart from each other such that a support pole penetrating through the penetration hole 5122 passes between the third case 5142 and the fourth case 5144.

The second pole connection screw 5146 may connect the third case 5142 and the fourth case 5144.

The distance between the third case 5142 and the fourth case 5144 can be adjusted by adjusting the degree of tightening of the second pole connection screw 5146. As a result, the holding portion 514 can be fixed to the support pole or the fixed state to the support pole can be released.

The hub 512 and either the third case 5142 and the second case 5144 fixed to the hub 512 may be configured as separate members, but may be formed integrally as one.

The plurality of main support units 520 may extend from an outer peripheral surface of the hub 512.

Specifically, each main support unit 520 of the plurality of main support units 520 may extend perpendicular to the extending direction of the support pole in a state where the fixing unit 510 is fixed to the support pole.

Further, the plurality of main support units 520 may extend from the outer peripheral surface of the hub 512 such that the angle between two main support units 520, which are adjacent to each other, is constant. For example, when the number of main support units 520 is three, the angle between two main support units 520, which are adjacent to each other, may be 120 degrees.

With such an isometric arrangement, physical interference between the plurality of wireless communication devices can be minimized, and the plurality of wireless communication devices can be disposed with better spatial efficiency.

In FIG. 5, support bracket 50 is shown as including three main support units 520, although the present disclosure is not limited thereto. For example, the support bracket of the present disclosure may include two or more main support units 520.

The connection unit 540 can include a third connection body 546, which can include a third link member 5462 and a third mounting member 5464.

One side of each third link member 5462 can be rotatably connected to one end of the main support portion 520 about a fifth rotation axis ax5. The fifth rotation axis ax5 may be parallel to the extending direction of the support pole in a state where the fixing unit 510 is fixed to the support pole.

The third mounting member 5464 may be rotatably connected to the other side of the third link member 5462 about a sixth rotation axis ax6 perpendicular to the fifth rotation axis ax5, and may be connected to a wireless communication device.

The three third connection bodies 546 may be connected to the three main support units 520, respectively, and the three wireless communication devices may be respectively connected to three third connection bodies 546.

The wireless communication device support bracket 50 according to the fourth embodiment of the present disclosure includes a plurality of main support units 520 extending from the hub 512 of the fixing unit 510, so that the interval between the wireless communication devices can be further widened, thereby having an effect of maximizing the spatial efficiency.

In FIG. 5, the support bracket 50 is shown to include only the main support unit 520 and not the sub-support unit, but the present disclosure is not limited thereto.

For example, at least one of the plurality of main support units 520 may be configured to connect with a sub-support unit (not shown). In this case, the sub-support unit may include one or more of a first support body (not shown) and a second support body (not shown).

The fifth embodiment of the present disclosure shown in FIG. 6 to FIG. 7, which will be described later, is different from one embodiment of the present disclosure shown in FIG. 1 and FIG. 2 in that the central support unit comprises a wall connection member. The different feature according to the fifth embodiment of the present disclosure will be described below with priority, and repeated description of the same configuration as that of one embodiment of the present disclosure is omitted.

Figure 6:
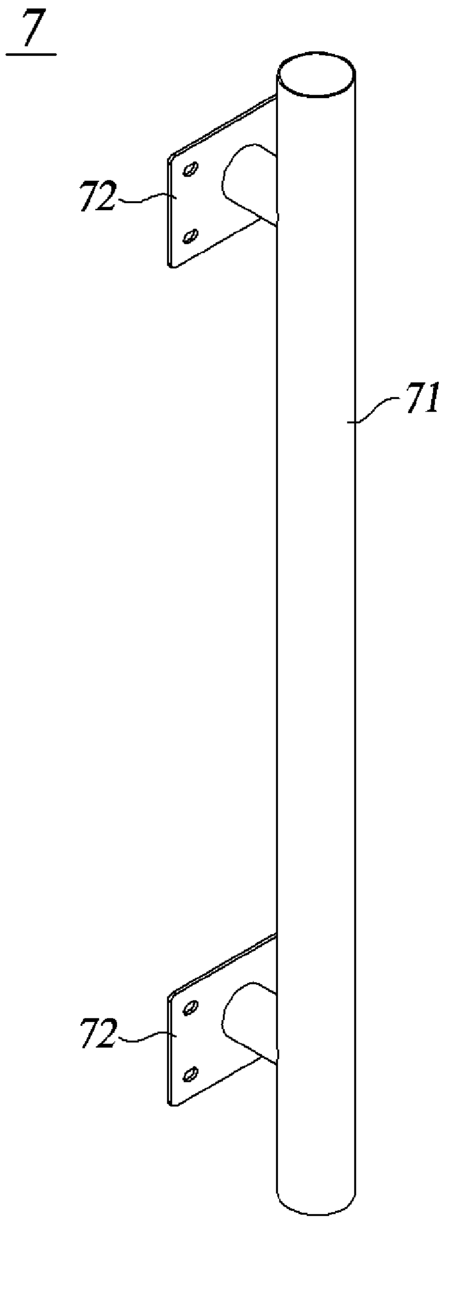
FIG. 6 is a perspective view of a central support unit according to a fifth embodiment of the present disclosure.

FIG. 6 is a perspective view of a central support unit 7 according to a fifth embodiment of the present disclosure.

Figure 7:
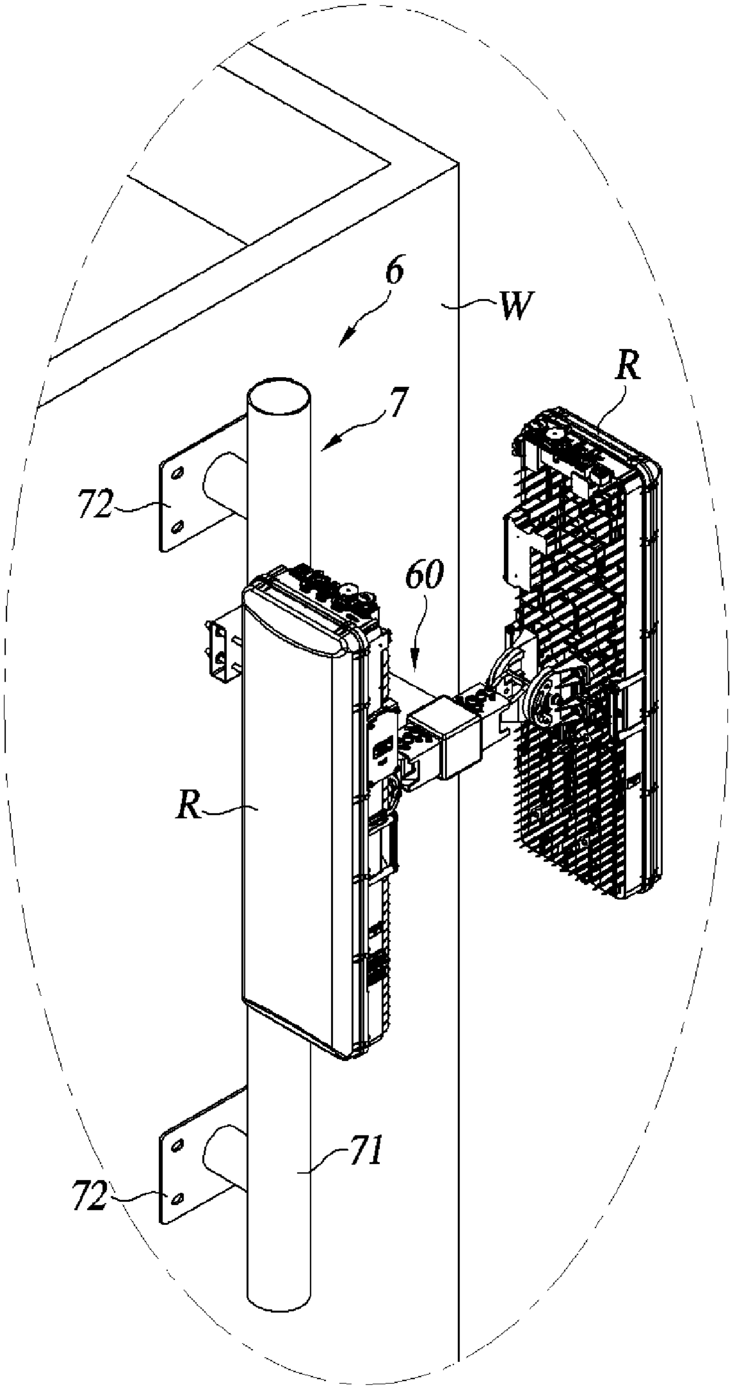
FIG. 7 illustrates a state in which a wireless communication device support assembly according to the fifth embodiment of the present disclosure is secured to a wall.

FIG. 7 illustrates a state in which a wireless communication device support assembly 6 according to a fifth embodiment of the present disclosure is fixed to a wall W.

Referring to FIG. 6 and FIG. 7, the central support 7 may comprise a support pole 71 and a wall connection member 72.

The wall connection member 72 may be formed on one side of the support pole 71 and may be configured to be fixed to the outer wall W.

The wall connection member 72 may be arranged one at each end of the support pole 71. However, the present disclosure is not limited thereto, and one or more wall connection members 72 may be provided.

The wall connection member 72 may have a flat plate shape to improve contact with the flat wall W.

The wall connection member 72 may be secured to the outer wall W via screw joint, but may also be secured in other ways.

The sixth embodiment of the present disclosure shown in FIG. 8 to FIG. 9 which will be described later is different from the fifth embodiment shown in FIG. 6 to FIG. 7 in that the wall connecting member has a bent shape. The different feature according to the sixth embodiment of the present disclosure will be described below with priority, and repeated description of the same configuration as that of the fifth embodiment of the present disclosure will be omitted.

Figure 8:
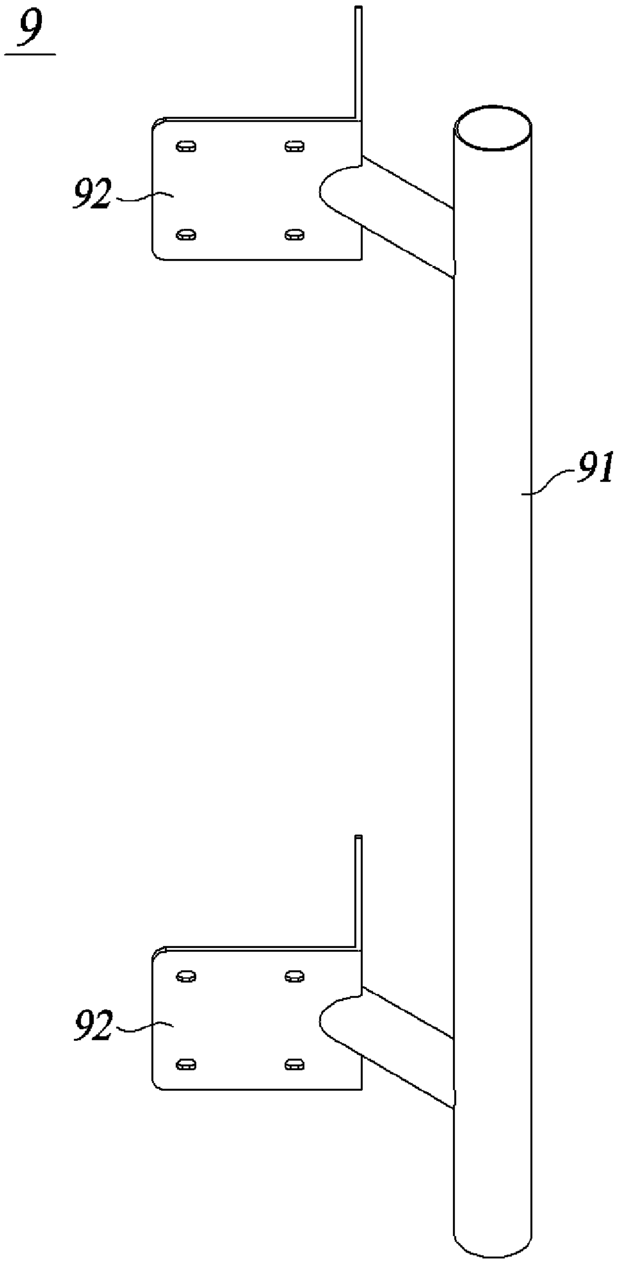
FIG. 8 is a perspective view of a central support unit according to a sixth embodiment of the present disclosure.

FIG. 8 is a perspective view of a central support unit 9 according to a sixth embodiment of the present disclosure.

Figure 9:
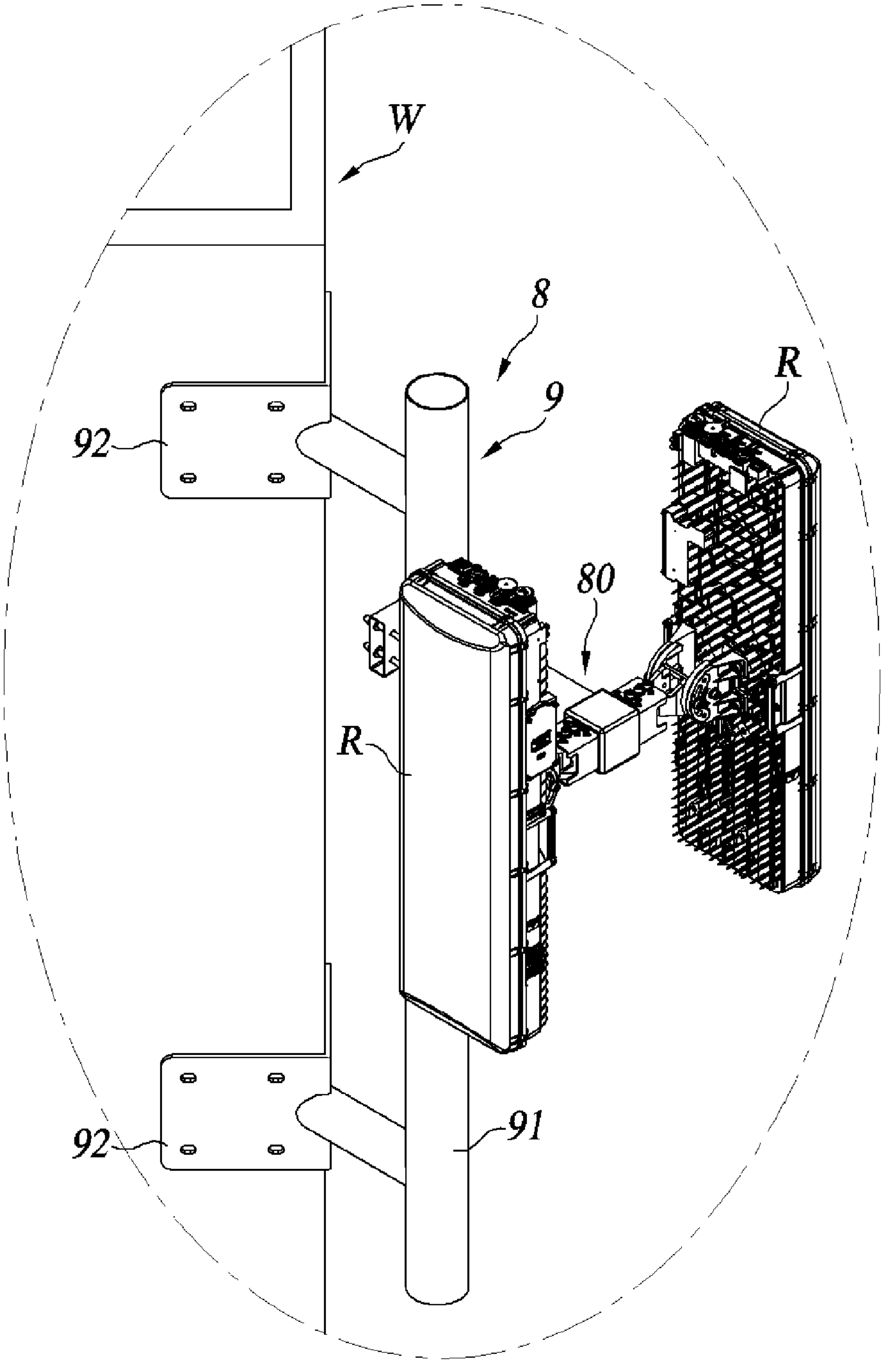
FIG. 9 illustrates a state in which a wireless communication device support assembly according to the sixth embodiment of the present disclosure is secured to a wall.

FIG. 9 shows a state in which the wireless communication device support assembly 8 according to the sixth embodiment of the present disclosure is fixed to the wall W.

Referring to FIG. 8 and FIG. 9, a wall connection member 92 may have a bent shape. As a result, the wall connection member 92 can improve contact with the wall W by having an uneven shape.

The bending angle of the wall connection member 92 may vary depending on the angle of wall W on which the central support unit 9 is installed. For example, if the wall W provided with the central support unit 9 is at a right angle, the bending angle of the wall connection member 92 may be a right angle.

In addition, the shape of the bent surface of the wall connection member 92 may vary depending on a shape of a wall W on which the central support unit 9 is provided.

For example, if the wall W on which the central support unit 9 is provided has a curved surface, the shape of the bent surface of the wall connection member 92 may have a curve corresponding to that of the wall W.

The wall connection members 92 may be arranged one at each end of the support pole 91. However, the present disclosure is not limited thereto, and one or more wall connection members 92 may be provided.

Figure 10:
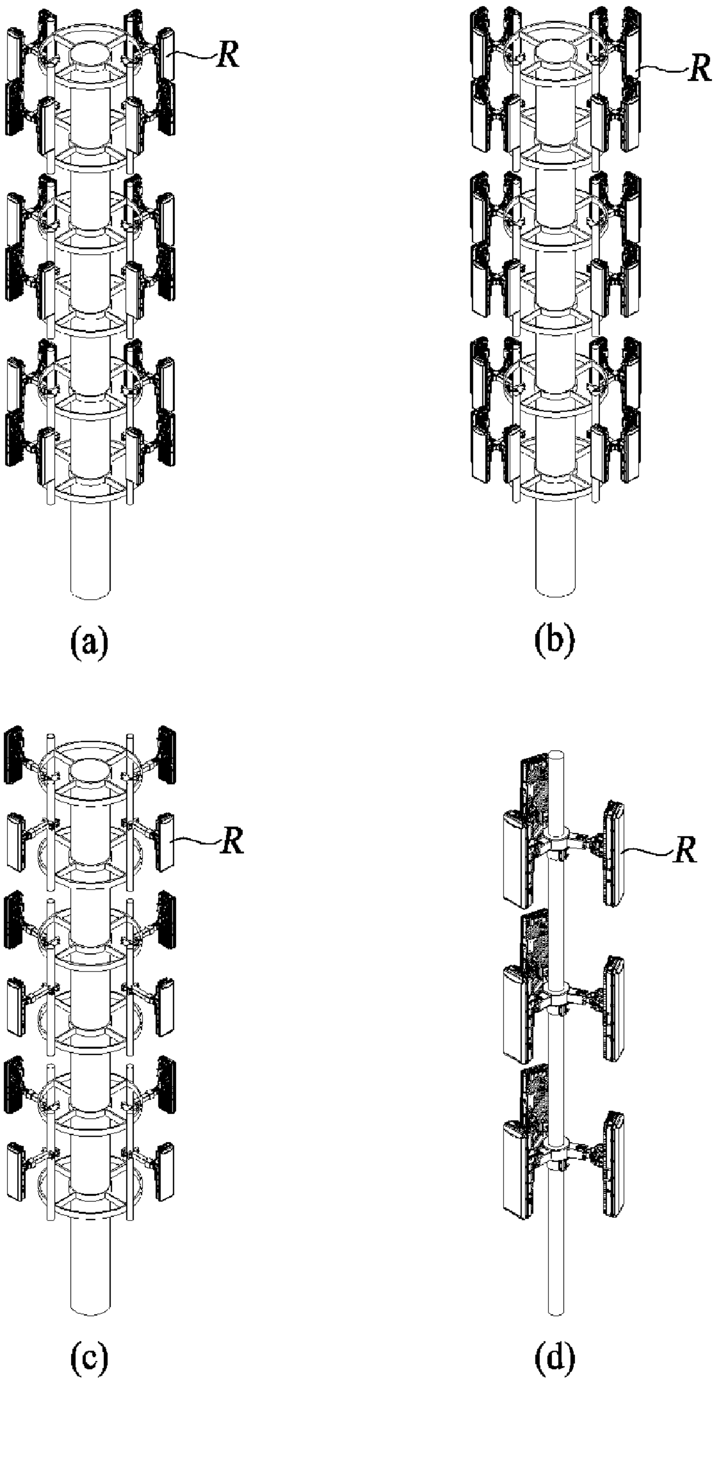
FIG. 10 illustrates a state in which a wireless communication device is mounted to a wireless communication device support assembly according to various embodiments of the present disclosure.

FIG. 10 illustrates a state in which a wireless communication device R is mounted to a wireless communication device support assembly according to various embodiments of the present disclosure.

Referring to FIG. 10A to FIG. 10D, a state is shown in which a plurality of communication devices R are fixed to a wireless communication device support assembly according to a first embodiment to a fourth embodiment of the present disclosure.

As shown in FIG. 10, the wireless communication device support bracket and the central support unit according to the present disclosure can be variously modified or applied in shape and configuration depending on the installation environment or the plurality of wireless communication devices R to be installed. As a result, the plurality of wireless communication devices R can be arranged with better spatial efficiency.

The foregoing description is merely illustrative of the teachings of the present embodiments, and various modifications and changes may be made without departing from the essential characteristics of the embodiments by those skilled in the art. Therefore, the present embodiments are not intended to limit the technical idea of the present embodiment, but are intended to be described, and the scope of the technical concept of this embodiment is not limited by this embodiment. The scope of protection of the present embodiment is to be interpreted by the following claims, and all technical ideas that fall within the range equivalent thereto should be interpreted as being included in the scope of the invention.

What is claimed is:

1. A wireless communication device support bracket for fixing a wireless communication device to a support pole, comprising:

a fixing unit configured to be fixed to the support pole;

a main support unit extending from the fixing unit in a first direction;

a sub-support unit comprising a plurality of support bodies each extending from one end of the main support unit; and a connection unit comprising a plurality of connection bodies each rotatably connected to one of the plurality of supporting bodies about at least two rotation axes, and connected with the wireless communication device, wherein each of the plurality of connection bodies has different rotation axis from the other of the plurality of connection bodies.

2. The device of claim 1, wherein the plurality of support bodies comprise a first support body extending from one end of the main support unit along a second direction different from the first direction, and the plurality of connection bodies comprise a first connection body rotatably connected to one end of the first support body about at least two rotation axes, and configured to be connected to the wireless communication device.

3. The device of claim 2, wherein the first direction is perpendicular to an extending direction of the support pole in a state in which the fixing unit is fixed to the support pole, and the second direction is perpendicular to the first direction.

4. The device of claim 2, wherein the first connection body, comprising:

a first link member having one side rotatably connected to one end of the first support body about a first rotation axis; and a first mounting member connected to the other side of the first link member and configured to be connected with the wireless communication device, wherein the first rotation axis is parallel to an extending direction of the support pole in a state where the fixing unit is fixed to the support pole.

5. The device of claim 4, wherein the first mounting member is rotatably connected to the other side of the first link member about a second rotation axis perpendicular to the first rotation axis.

6. The device of claim 2, wherein two first support bodies each extend from both sides of one end of the main support unit.

7. The device of claim 2, wherein the plurality of support bodies further comprise a second support body extending along the first direction from one end of the main support unit, and wherein the connection unit further comprises a second connection body rotatably connected to one end of the second support body about at least two rotation axes and configured to be connected to the wireless communication device.

8. The device of claim 7, wherein the second connection body, comprising:

a second link member having one side rotatably connected to one end of the second support body about a third rotation axis; and a second mounting member connected to the other side of the second link member, the second mounting members being configured to be connected with the wireless communication device, wherein the third rotation axis is parallel to an extending direction of the support pole in a state where the fixing unit is fixed to the support pole.

9. The device of claim 8, wherein the second mounting member is rotatably connected to the other side of the second link member about a fourth rotation axis perpendicular to the third rotation axis.

10. The device of claim 1, wherein the fixing unit, comprising:

a first case connected to the other end of the main support unit;

a second case that is disposed apart from the first case, the second case facing the first housing in the first direction; and a first pole connection screw connecting the first case and the second case, wherein the fixing unit is configured to be fixed to the support pole by pressing the support pole through the first case and the second case in a state where the support pole is disposed between the first and second cases.

11. The device of claim 1, wherein the device comprises a plurality of main support units including the main support unit.

12. The device of claim 11, wherein in a state in which the fixing unit is fixed to the support pole, each main support unit of the plurality of main support units extends from the fixing unit perpendicularly to an extending direction of the support poles.

13. The device of claim 12, wherein the fixing unit, comprising:

a hub including a penetration hole configured to let the support pole through; and a holding portion disposed on one side of the hub, the holding portion being configured to be fixed to a support pole penetrating through the penetration hole, wherein the plurality of main support units extends from an outer peripheral surface of the hub.

14. A wireless communication device support bracket for fixing a wireless communication device to a support pole, comprising:

a fixing unit configured to be fixed to the support pole and configured to be movably fixable along the support pole;

a main support unit extending from the fixing unit in a first direction;

a sub-support unit extending from one end of the main support unit; and a connection unit rotatably connected to the sub-support unit about at least one rotation axis, and connected with the wireless communication device, wherein:

the sub-support unit comprises a first support body extending from one end of the main support unit along a second direction different from the first direction, and the connection unit comprises a first connection body rotatably connected to one end of the first support body about at least one rotation axis, and configured to be connected to the wireless communication device, wherein the first connection body, comprising:

a first link member having one side rotatably connected to one end of the first support body about a first rotation axis; and a first mounting member connected to the other side of the first link member and configured to be connected with the wireless communication device, and wherein the first rotation axis is parallel to an extending direction of the support pole in a state where the fixing unit is fixed to the support pole.

15. The device of claim 14, wherein the first mounting member is rotatably connected to the other side of the first link member about a second rotation axis perpendicular to the first rotation axis.

* * * * *